United States Patent [19]

Arentoft

[11] Patent Number: 4,922,857
[45] Date of Patent: May 8, 1990

[54] METHOD AND SYSTEM FOR FEEDING FURRED ANIMALS WITH DRY FODDER

[76] Inventor: Mogens Arentoft, Lövlundvej 13, DK-7190 Billund, Denmark

[21] Appl. No.: 263,379

[22] Filed: Oct. 27, 1988

[51] Int. Cl.⁵ .............................................. A01K 5/02
[52] U.S. Cl. .................. 119/51.12; 119/51.11
[58] Field of Search ............ 119/51.11, 51.12, 52 AF, 119/53, 56 R

[56] References Cited

U.S. PATENT DOCUMENTS

| | | | |
|---|---|---|---|
| 579,245 | 3/1897 | Terry | 119/51.11 |
| 2,066,264 | 12/1936 | Fisher | 119/53 |
| 2,534,442 | 12/1950 | Harvey | 119/51.11 |
| 3,330,255 | 7/1967 | Scott et al. | 119/52 AF |
| 3,388,690 | 6/1968 | Hosteler | 119/53 |
| 3,504,654 | 4/1970 | Geerlings | 119/56 R |
| 3,547,081 | 6/1970 | Geerlings | 119/51.11 |
| 4,183,327 | 1/1980 | Olsen | 119/51.11 |
| 4,284,035 | 8/1981 | White | 119/51.11 |
| 4,337,728 | 7/1982 | Gilst et al. | 119/51.11 |
| 4,488,509 | 12/1984 | Awalt | 119/53 |
| 4,617,874 | 10/1986 | Zammarano | 119/51.12 |
| 4,770,125 | 9/1988 | Gold et al. | 119/56 R |
| 4,815,417 | 3/1989 | Strong | 119/51.12 |

Primary Examiner—Paul J. Hirsch
Attorney, Agent, or Firm—Antonelli, Terry & Wands

[57] ABSTRACT

Dry feeding of minks if usually effected by means of self feeding dispensers, from which the animals may eat freely and as desired. In connection with the invention it has been found that the animals thrive considerably better if they are feeded by measured small fodder portions some 6-8 times per 24 hours and noticeably mostly during the evening and night hours. For avoiding costs of manual attendence during these hours an associated automatic feeding system is used, comprising automatically operated dispensers in the single cages.

13 Claims, 2 Drawing Sheets

METHOD AND SYSTEM FOR FEEDING FURRED ANIMALS WITH DRY FODDER

BACKGROUND AND SUMMARY OF THE INVENTION

The present invention relates to a method of effecting feeding in fur farms, primarily in mink farms. Traditionally mink feeding is carried out by delivering some times during the day a paste-like wet fodder, which is placed in lumps on the net top of the cages, from where the animals can pick down the fodder. The delivery may take place by means of a fodder cart, which is designed to enable the operator, by means of a discharge hose, to dose out rather accurate fodder portions to the single cages. As the minks, by nature, are mainly night animals it would be good if they could be fed also some times during the night, but that would involve considerable costs due to the need of personnel. For this reason, inter alia, the use of self feeding dispensers holding dry fodder in the form of pills has become increasingly common, these pills being well suited for use in reasonably large portions in such dispensers, as the pill material is much less perishable than the wet fodder. In such dry feeding systems it is sufficient, therefore, to fill up the dispensers at intervals of, say, one or few days, and in the meantime the animals may serve themselves both day and night.

It has been found however, that not either the latter feeding method is also not perfect. The ample or unrestricted access to the dry fodder in the dispensers seems to result in the animals by concentrated eating being surfeited and supine, whereby they sleep much and do not show the growth they ought to. Probably it would be advantageous if the easy access to the fodder could be made less easy, but a restriction of the supply flow could easily result in a total blocking up of the flow, and in fact it is already a problem that blockings may occur in the dry fodder dispensers used so far.

It is the purpose of the invention to provide a method, whereby a practically optimal feeding is achievable.

The invention is based on the finding that by an automatically controlled discharge of the dry fodder from the dispensers several important advantages are achievable, viz. (1) The feeding may be effected at all desired times, during the day and particularly during the night, without any need of attention other than possibly necessary for the supply of relatively large fodder portions to the dispensers within normal working hours, (2) The feeding may be effected by fodder portions sufficiently small to ensure that the animals cannot overfill themselves, yet sufficiently large to be handled by relatively coarse dispension means without causing any blocking thereof or therein, i.e. a safe feeding is achievable by a fodder supply which is restricted, not by a general supply flow restriction, but by the restriction conditioned by an intermittent operation of the associated feeding dispenser, and (3) The very come-out of the intermittent feedings will contribute to keep the animals active, as they will both feel and get used to the turning up of fodder portions, by day and not least by night, which portions will be all the same attractive, just because the animals will not get surfeited with any of them. Observations have shown that the animals will hereby show a noticeably improved growth and that the fodder is utilized much more effectively.

It is readily admitted that in connection with some other kinds of animal breeding it is well known to use automatic feeding systems, but apparently it has not until now been realized that such systems, properly adapted for the purpose, will be usable with quite special advantages in the breeding of minks.

The invention also comprises the relevant feeding systems and the associated, automatically operated feeding dispensers. While the known self-feeding dispensers operate under the condition that the fodder is supplied quite slowly, depending the animal's eating of the fodder, the dispensers according to the invention will operate by intermittent dumping of relatively large fodder portions, whereby the risk of the supply being blocked will be considerably reduced. The same dumpings with their associated small shakings from the applied operation movements will act wakening on slumbering animals, whereby these are activated in an advantageous manner.

As a practical example, some 70 g fodder should be supplied per animal per 24 hours, of which 30-40% should be supplied during the day hours between 7 a.m. and 5 p.m. and the rest during the evening and the night. The single doses should be of the magnitude 10 grammes.

BRIEF DESCRIPTION OF THE DRAWINGS

In the following the invention is described in more detail with reference to the drawing, in which.

DETAILED DESCRIPTION OF THE DISCLOSED EMBODIMENTS

Figure 1:
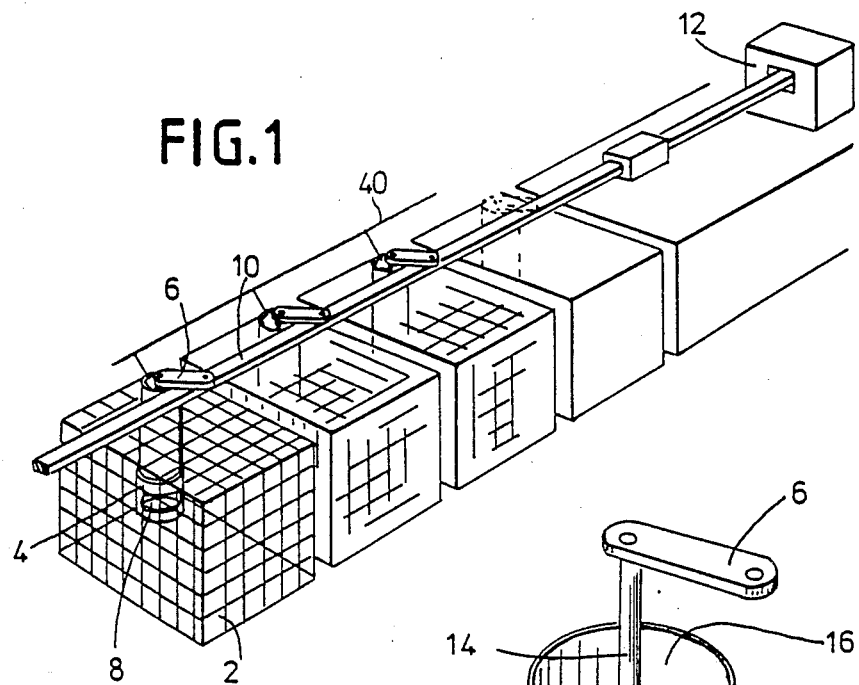
FIG. 1 is a schematic perspective view of a row of mink cages provided with a feeding system according to the invention.

In FIG. 1 is shown a row of cages 2 each provided with a feeding dispenser 4 comprising an upwardly open tube 5, which is fillable with dry fodder from above and has a built-in portioning downlet valve, which is operable by an upper pivot lever 6 to sluice down a fodder portion to the lower end of the tube 5, in which there is provided a side opening 8, through which the let-down fodder is accessible for the animal or animals in the single cage. The pivot levers 6 are coupled to an actuation rod 10, which is reciprocably displaceable from a driving station 12 for pivoting the levers 6 forth and back and therewith for actuation of the respective associated downlet valves. The driving station 12 may be controlled by a timer, such that the dosing out of the single fodder portions may be effected automatically at all desired times of the day and night and, as mentioned, even predominantly during the evening and the night.

Figure 2:
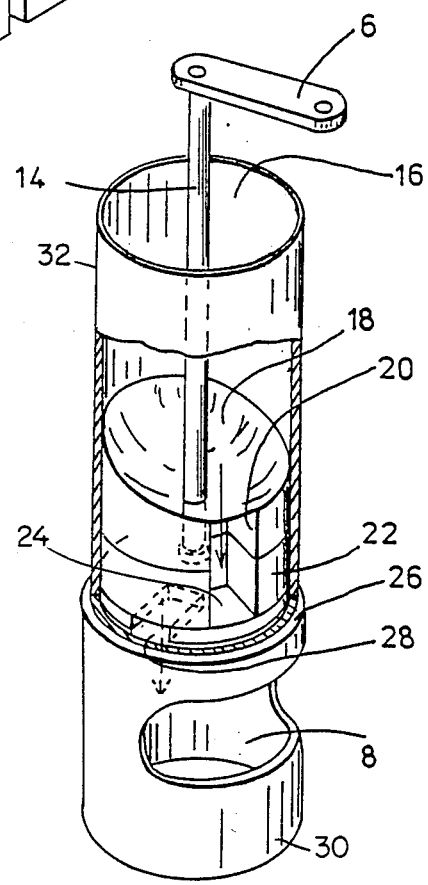
FIG. 2 is a perspective view of a dispenser as used in the system.

The dispensers 4 may be designed in many different manners, a well usable embodiment being shown in FIG. 2, adapted to be operated by the pivoting movement of the upper actuator lever 6. This lever is connected with a downwardly extending shaft 14 stretching through an upper storage chamber 16 of the tube pipe 4 down to a downlet valve structure mounted just above the side opening 8. The valve structure comprises an upper, intermediate bottom block member 18, which is rigidly fastened to the tube 4 and has a top surface downwardly vaulted towards an outer, axial through passage 20, and, underneath the block member 18, a thick disc 22, which is in rigid connection with the shaft 14 and has an outer, axial through passage 24, which, by a pivoting of the lever 6 may be rotated to and from a position just underneath the upper passage 20. Underneath the disc 22 is mounted another disc 26, which is rigidly fastened to the tube 4 and has an axial through passage 28, the cross sectional shape of which corresponds to that of the passages 20 and 24, but which is peripherally staggered from the upper passage 20 in such a manner that the passage 24 in the rotatable disc 22 by a pivoting forth and back of the lever 6 will be movable between opposed positions, in which the passage 24 will correspond with the passages 20 and 28, respectively.

In this manner there is provided a downlet valve, in which fodder portions are measured out in the passage 24 and are brought to fall freely down through the bottom passage 28 to the bottom of the tube 4 when the lever 6 is operated. It can be chosen to utilize a "normal function", by which the passage 24 is not moved into full debouching into the outlet passage, such that only a part of the fodder portion will be discharged; by an adjustment of the end positions of the actuator rod it is then, when desired, possible to produce an increase or a decrease of the fodder doses. Such general adjustments may be desirable during certain periods of time, e.g. just before the pairing period.

The tube 4 may be designed telescopically with a lower end portion 30 provided with the hole 8 and consisting e.g. of stainless steel, and an upper pipe portion 32 which is secured to the cage in any suitable manner, whereby the height position of the eating opening 8 and the associated bottom of the said end portion 30 may be adjusted according to the requirements.

The fodder may be filled into the chambers 16 manually or by supply from an automatic conveyor, e.g. as known from hog feeding systems. The dosing out of the fodder portions could even be arranged to take place directly from such a conveyor system in the desired intermittent manner.

In the dispenser according to FIG. 2 the shaft 14 may be provided with radially projecting stirring pins down in the chamber 16, whereby possible formations of holding bridges in the fodder material may be counteracted. The pronounced concavity of the upper valve block member 18 towards the passage 20 results in the fodder sinking down all over the cross section of the chamber 16, so that no part of the material will stand still during the successive feeding operations and thus not become tainted.

Figure 3:
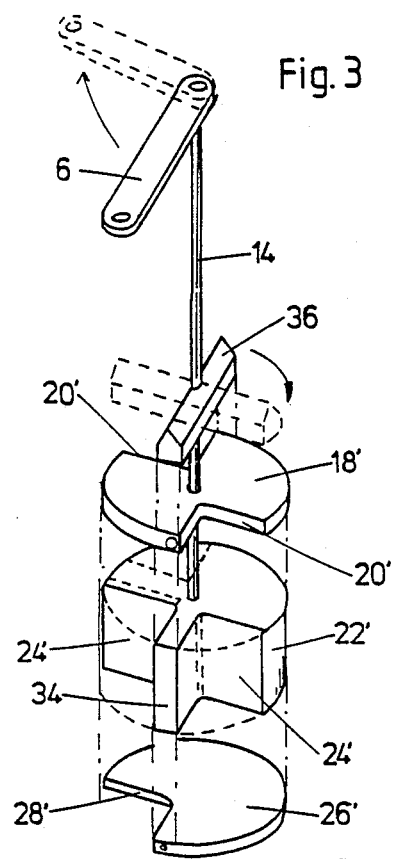
FIG. 3 is a perspective exploded view of the interior parts of a modified dispenser.
Figure 4:
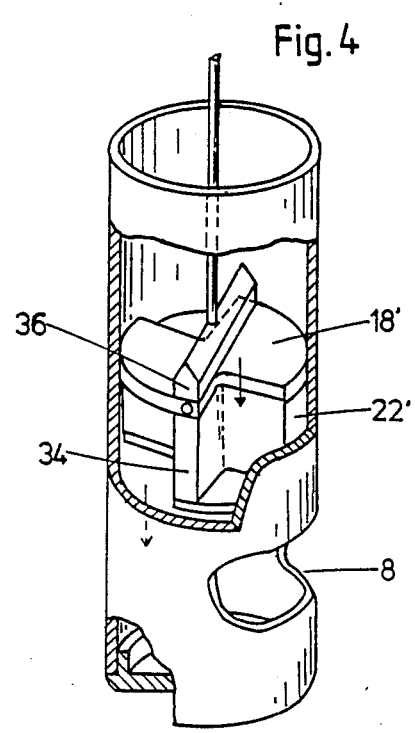
FIGS. 4-6 are perspective views, partly in section, of the lower end portion of such a modified dispenser.
Figure 5:
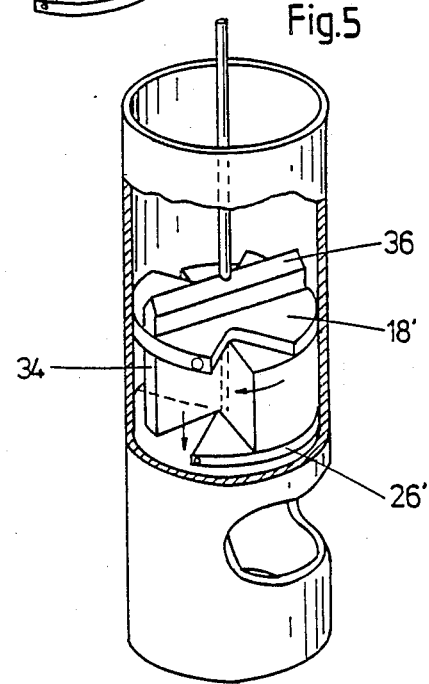
Figure 6:
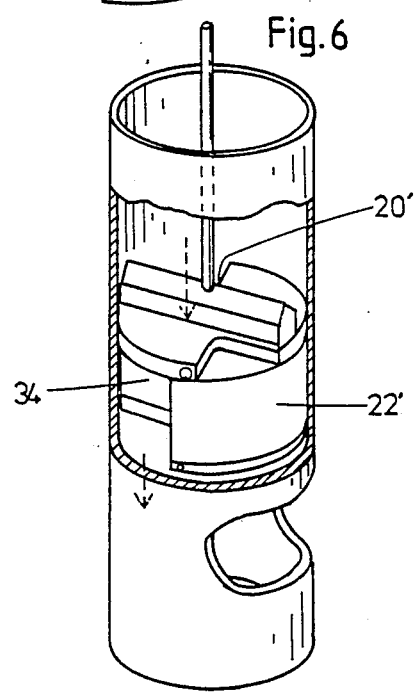

FIGS. 3-5 show a preferred design of the valve in the dispenser. Here the upper valve block member is a thin disc 18' having two opposed notches 20', while the intermediate thick disc 22' has two notches 24' similar to the notches 20', but located next to each other, separated by a narrow wing portion 34. The lower valve disc 26' has but a single similar notch 28'. As in FIG. 2 the intermediate member 22' is connected with the shaft 14, while the two outer members 18' and 26' are rigidly held in the tube 4, with their respective notches 20' and 28' out of registry. On the top of the upper disc 18' is placed a cross block member 36, which is rigidly connected with the shaft 14, such that in operation it will be turned between the opposed positions shown in FIGS. 4 and 6, respectively.

The valve here discussed is a double acting valve which will deliver a fodder portion as housed in either of the notch passages 24' through the bottom notch 28' each time the lever 6 is pivoted in either direction. In that respect the drawings are believed to be self-explanatory, and it just remains to be added that the upper cross member 36 will serve to scrape material rested on the flat top disc 18' into the respective opposite notches 20', such that the material cannot collect or be left resting on the top disc. This again results in the material sinking through the chamber 16 all over the cross section thereof.

The invention is not limited to the rotary arrangement of the valve system, since as already well known the intermediate valve member 22, 22' of a dosing outlet valve may be arranged to move in a linear manner.

It will be relevant to effect some 5-15 feedings per 24 hours, preferably 6-8 feedings, and more than the half of them should be effected during the evening and night hours.

The said conveyor system for supplying fodder to the dispensers is shown only very schematically at 40 in FIG. 1.

I claim:

1. A method of effecting feeding in fur farms; primarily mink farms, wherein fur bearing animals are located in respective ones of a plurality of cages having dry fodder containing feeding dispensers with means for supplying portions of fodder contained in said dispensers to the animals, comprising effecting an intermittent supply of fodder portions by means of said dispensers and said means for supplying so as to satisfy the normal feeding requirements of the animals, said intermittent supply providing 5-15 feedings per 24 with more than 50% of the feedings being effected during the evening and night hours between 5 p.m. and 7 a.m.

2. A method according to claim 1, wherein the dispensers are operable to effect outdosing of measured fodder portions, the cages are arranged in a row, and wherein the dispensers for the row of cages are operatively connected in common to a driving station adapted to actuate the dispensers at least five times per 24 hours and such that more than the half of these operations take pace during the evening and night hours between 5 p.m. and 7 a.m.

3. A method according to claim 1, wherein said fur bearing animals are mink.

4. A method according to claim 1, wherein said intermittent supply provides 6-8 feedings per 24 hours with more than 50% of the feedings being effected during the evening and night hours between 5 p.m. and 7 a.m.

5. A method according to claim 1, wherein said means for supplying includes valve means in the form of preadjusted volumetric dosing valves in each of the dispensers, said valves being operated so as to deliver but a single fodder dose by each feeding in said intermittent supply.

6. A method according to claim 1, wherein said means for supplying includes, in each of the dispensers, valve means controlled by a limited rotational movement of a valve shaft having a radial arm, the cages being arranged in a row, and wherein the radial arms of the dispensers are each pivotally connected to an activator rod which extends along the row of cages, all of the valve means being activated in response to the activator rod being displaced sufficiently to swing the radial arms forth and back through an angle which is less than or equal to 90 degrees, and whereby the activator road is operatively displaced only once per feeding so as to carry out only one, single or double stroke by each feeding.

7. A feeding system for effecting feeding in fur farms, primarily mink farms, comprising fur bearing animals located in respective ones of a plurality of cages having dry fodder containing feeding dispensers with means for supplying portions of fodder contained, in said dispensers to the animals, the dispensers being operable to effect outdosing of measured fodder portions, the cages being arranged in a row, the dispensers for the row of cages being operatively connected in common to a driving station adapted to activate the dispensers at least five times per 24 hours and such that more than the half of these operations take place during the evening and night hours between 5 p.m. and 7 a.m., and in which the feeding dispensers are formed as cylindrical units having an upper supply container portion with a fixed bottom member, in a peripheral portion of which a downlet passage is provided, a rotatable sluice valve member being provided between the lower side of the bottom member and an additional bottom plate member and having a receiver opening operable to be moved between a receiver position underneath said downlet passage and a delivery position above an area in which the additional bottom plate is absent, said container portion underneath the additional bottom plate being extended into an eating trough portion, while the sluice valve member is connected with actuator means to said driving station for rotation of this member through an angle of less than or equal to 90 degrees between the receiver position and the delivery position.

8. A feeding system according to claim 7, in which the actuator means comprise a central shaft, which projects upwardly from the sluice valve member through a central hold in the upper bottom member and up beyond top end of the supply container, where it is provided with a radial arm for operative connection with the driving station.

9. A system according to claim 7, in which the supply container, consisting of plastic, is telescopically adjustably connected with a lower eating trough portion consisting of stainless steel.

10. A system according to claim 7 and also comprising a conveyor system for supplying fodder to the supply containers.

11. A system according to claim 7, in which the top side of the upper fixed bottom member is pronounced downwardly inclined towards its peripheral downlet passage.

12. A system according to claim 7, in which the upper fixed bottom member is provided with two opposite downlet passages and the lower bottom plate with one outlet opening located underneath a portion of the upper bottom member between said downlet passages thereof, the intermediate sluice valve member having two through-passages located side by side so as to be shiftable in a double acting manner between communication with the said downlet opening and the respective opposed downlet passages, respectively.

13. A system according to claim 12, in which the top side of the upper fixed bottom member cooperates with a diametrically arranged scraper member, which is reciprocally rotated together with the shaft.

* * * * *